Figure 1:
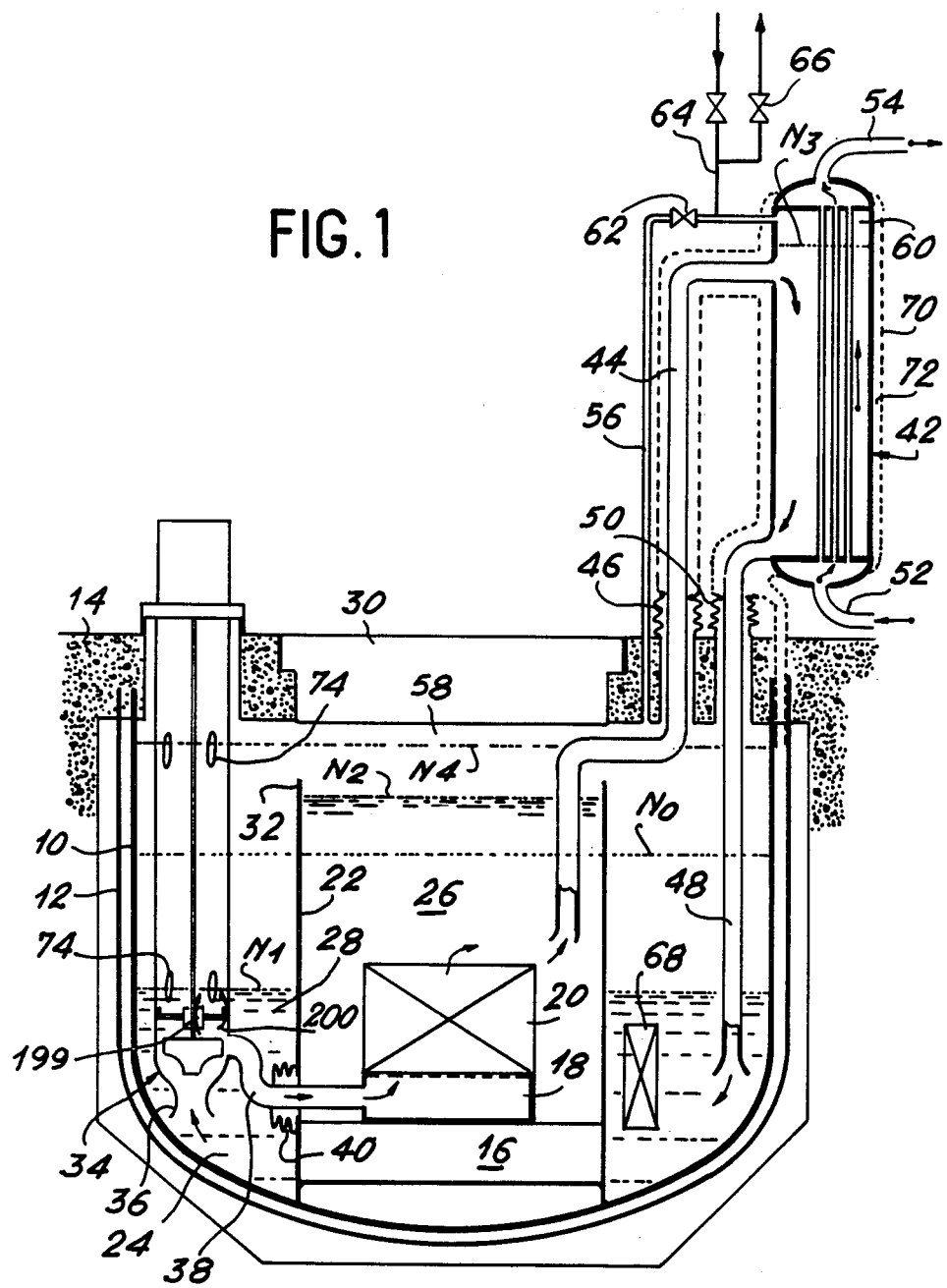

United States Patent [19] [11] Patent Number: 4,608,224
Brachet [45] Date of Patent: Aug. 26, 1986

[54] NUCLEAR REACTOR COOLED BY A LIQUID METAL

[75] Inventor: Alain Brachet, Orsay, France

[73] Assignee: Service National Electricite de France, France

[21] Appl. No.: 556,067

[22] Filed: Nov. 29, 1983

Related U.S. Application Data

[63] Continuation of Ser. No. 277,639, Jun. 26, 1981, abandoned.

[30] Foreign Application Priority Data

Jul. 4, 1980 [FR] France .............................. 80 14963

[51] Int. Cl.$^4$ .................. G21C 9/00; G21C 15/18; G21C 19/00
[52] U.S. Cl. .................................. 376/405; 376/214; 376/292; 376/298; 376/307; 165/104.28
[58] Field of Search ................................ 376/402–405, 376/290, 292, 298, 299, 285, 307, 214; 165/104.28, 104.31

[56] References Cited

U.S. PATENT DOCUMENTS

| 3,793,143 | 2/1974 | Muller | 376/298 |
| 3,830,695 | 8/1974 | Sauvage | 376/298 |
| 3,932,214 | 1/1976 | Aubert et al. | 376/405 |
| 4,115,192 | 9/1978 | Jogand | 376/298 |
| 4,243,487 | 1/1981 | Schweiger | 376/298 |
| 4,293,385 | 10/1981 | Brachet | 376/405 |
| 4,294,658 | 10/1981 | Humphreys et al. | 376/404 |
| 4,342,721 | 8/1982 | Pomie et al. | 376/405 |

FOREIGN PATENT DOCUMENTS

| 1815046 | 6/1970 | Fed. Rep. of Germany | 376/292 |
| 2535378 | 2/1977 | Fed. Rep. of Germany | 376/404 |
| 929785 | 6/1963 | United Kingdom | 376/292 |
| 1405443 | 9/1975 | United Kingdom | 376/405 |
| 1421826 | 1/1976 | United Kingdom | 376/298 |

Primary Examiner—Harvey E. Behrend

[57] ABSTRACT

Nuclear reactor cooled by a liquid metal comprising a main vessel sealed by a sealing slab, said vessel containing liquid metal overhung by a covering of inert gas, the reactor core being placed in a primary vessel integrated into the main vessel in such a way that the primary vessel at the outlet from the core constitutes a hot collector for the liquid metal and the space defined between the main vessel and the primary vessel constitutes a cold collector for the liquid metal, at least one heat exchanger supplied by the liquid metal contained in the hot collector under the action of at least primary pumps located in the main vessel, wherein the exchanger is positioned outside the main vessel at a level above that of the sealing slab and communicates with the hot collector by at least one intake pipe and with the cold collector by at least one outlet pipe, it being possible to empty the exchanger and pipes into the main vessel by gravity, the upper part of each exchanger being filled with the inert gas covering of the main vessel by at least one gas pressure balancing pipe in which is arranged at least one valve closed under normal operating conditions, the inert gas covering of the main vessel being pressurized in such a way that the exchanger is filled with liquid metal by counterpressure, the opening of the said valve controlling the emptying of the exchanger and the corresponding intake and outlet pipes into the main vessel.

11 Claims, 7 Drawing Figures

NUCLEAR REACTOR COOLED BY A LIQUID METAL

This application is a continuation, of application Ser. No. 277,639, filed June 26, 1981 now abandoned.

The present invention relates to a new type of nuclear reactor cooled by a liquid metal and more specifically relates to a novel design for the primary circuit of such reactors.

The invention also relates to a primary circulating pump and a heat exchanger designed for use in such a reactor.

In known manner, nuclear reactors cooled by a liquid metal, generally sodium, comprise one or more liquid sodium primary heat transfer circuits which extract the heat from the fissile core of the reactor. Each primary heat transfer circuit then transfers this heat to one or more heat exchangers placed between said primary heat transfer circuit and one or more liquid sodium intermediate or secondary heat transfer circuits Each intermediate circuit supplies a steam generator, whose secondary fluid is water which, after vaporization, operates a turbogenerator.

A variant is directed at eliminating the secondary sodium circuits. In this case, the sodium of the primary circuit directly supplies the primary circuit of one or more steam generators.

It is pointed out that the invention can be applied to one or other of the two variants referred to hereinbefore. In this connection, it is pointed out that throughout the remainder of the description, the term "heat exchanger" designates either a heat exchanger between the primary and secondary circuits of the first variant or a steam generator constituting a special type of heat exchanger between the primary circuit and the water/steam circuit in the second variant.

On now considering only the design of the primary circuit or circuits in the liquid sodium cooled nuclear reactors, a distinction can be made in the present state of the art between two types of primary circuits generally designated respectively by the terms "integrated circuit" and "loop circuit".

When the primary heat transfer circuit is of the integrated type, the complete primary circuit is contained in a vessel called the main vessel, which is sealed by a slab and filled almost entirely by sodium surmounted by an atmosphere of neutral gas such as argon maintained at a pressure slightly above atmospheric pressure. In addition to the core of the reactor, located in a vessel called the inner vessel defining in the main vessel a hot collector and a cold collector, all the apparatus constituting the primary circuit and in particular the primary circulating pumps and exchangers are permanently submerged by the sodium contained in the vessel.

This integrated design offers a number of advantages, particularly from the safety angle, because it ensures e.g. an excellent confinement of the radioactive materials, a high thermal inertia and relatively simple hydraulic operation. However, it has certain disadvantages which lead to a high investment cost.

Some of these disadvantages are indicated below:

There is an important volume of dead spaces within the main vessel obviously utilized for increasing the thermal inertia, but contributing to increased costs.

The construction and assembly process is made very complex by the fact that it is successively necessary to fit together the individual components, so that any delay in the production of one component can have repercussions on the complete assembly, without it being possible to easily obviate this difficulty.

As in general there is little or no guidance or piping of the sodium within the vessel, difficult thermohydraulic problems can be caused. In turn, they lead to mechanical behaviour problems, whose solution makes it necessary to fit particularly expensive thermal baffles.

It is extremely difficult to strictly optimize the geometrical dimensioning of the main vessel, because it is dependent on a number of parameters such as the overall dimensions of the core or primary vessel, the diameter, number of even the mass of the components such as pumps and exchangers. Thus, dead spaces can result from a poor utilization of the space available for the core or the primary vessel.

The pressure drop of the exchangers leads to a rise in the sodium level in the primary vessel during reactor operation, which is added to the height of the sodium above the core necessary for handling the fuel under sodium in contributing to an increase in the height of the main vessel. This necessitates an increase in the length of all the equipment suspended on the sealing slabs (exchangers, pumps, core instrumentation cover, handling devices, control rods, etc.), which further increases the reactor costs.

The dimensioning of the primary exchangers is particularly difficult and therefore expensive, particularly as a result of the fact that it has to satisfy numerous contradictory requirements. Thus, as has been stated hereinbefore, its pressure drop in the primary circuit has repercussions on the height of the main vessel and must be kept as small as possible (in practice limited to approximately 2 m of sodium), whilst its length is also linked with the height of the vessel and its diameter must also be as small as possible so as not to excessively penalize the diameter of the main vessel. The limitation of the pressure drop leads to a reduction in the primary sodium rate within the outer ferrule of the exchanger, moves the tubes further apart and leads to the non-use of baffles. Thus, despite the good heat transfer properties of sodium, this leads to reduced efficiency. Moreover, as the flow of primary sodium within the exchanger is slow and with a low pressure drop, the supply of sodium is not of a uniform nature which causes significant disparities between the outlet temperatures of the various tubes as a function of their position, which calculates the mechanical behaviour calculations. All these effects together increase the cost of the exchangers.

Mechanical pumps with free surfaces are also very costly components, both for the reasons indicated hereinbefore and for specific reasons. Among these specific reasons, reference is made to the fact that the minimum absolute pressure required on suction for preventing cavitation is low, leading to the definition of a low rotation speed and to a large diameter impeller. Therefore, the pumps are heavy and expensive.

In the case of an incident on a secondary loop which leads to its being put out of operation, the interruption of the circulation of primary sodium in the corresponding intermediate exchanger or exchangers which is then necessary in order to be able to operate the reactor at reduced power requires the use of complex and costly systems for sealing the inlet ports of said exchangers.

This type of reactor is not very suitable for eliminating the intermediate circuits referred to hereinbefore. The reason is that it is difficult to envisage the possibility of integrating steam generators into the reactor vessel, particularly because they are much larger than the intermediate exchangers.

In a variant of the integrated type reactor consideration has been given to the use of a cylindrical primary vessel, which in itself has numerous advantages. However, the cylindrical configuration of the primary vessel complicates the hydraulic connection between the vessel and the exchanger, as well as the design of the latter. These disadvantages definitively reduce the intrinsic interest in this variant, particularly from the standpoint of the reduction of costs which it might permit.

In nuclear reactors cooled by liquid metal of the so-called loop type, the components such as intermediate exchangers at primary circulating pumps are positioned outside the main reactor vessel and communicate with the latter by means of connecting pipes defining closed loops. Such a design has certain advantages consisting more particularly of eliminating or reducing certain problems connected with the integrated circuit, e.g. those resulting from a close confinement of the components and a highly imbricated construction and assembly thereof. However, even these advantages are outweighed by other, often serious disadvantages, so that it is by no means certain that the loop construction leads to cost reductions compared with the integrated construction. Certain of these disadvantages are listed below.

It is necessary to design and construct an extensive, complex network of large- diameter pipes, equipped with double jackets for which certain stresses (earthquakes) are of a highly constraining nature.

Bearing in mind the small volume of the reactor vessel and in order to make it unnecessary on shutting down the installation to immerse the sealing slab or to expose the core to an exaggerated extent it is necessary to arrange the pumps and exchangers, as well as their connecting pipes in the immediate vicinity of one and the same horizontal plane. Thus, in operation, it is necessary to regulate the gas levels and pressures in two or three reservoirs in series, namely the reactor vessel, the pump and optionally the exchanger, if it has a free surface. The aforementioned controls must be carried out for each change to the hydraulic operating conditions.

Such a reactor is subject to a by no means negligible risk of entraining a gas bubble from a free surface and of injecting said bubble into the core, which could have particularly serious thermal and neutron consequences.

The very small volumes of the hot and cold collectors defined within the main vessel, respectively at the outlet and inlet of the reactor core lead to thermal shocks which are much more severe than in the case of integrated reactors. The alternative, which is not very satisfactory from the safety standpoint, is a forced slowing down of the pumps in the case of a thermal transient.

The high pressure part of the primary circuit (pump/core/connection or pump/exchanger/core connection, as a function of the relative position of pump and exchanger) is not doubly confined as in the case of integrated reactors, so that if a break occurs in this portion of the circuit and despite the double envelope the consequences can be highly prejudicial.

The choice of the respective position of the pump and the exchanger does not provide such a completely satisfactory solution. Thus, if the pump is located on the cold branch of the circuit and directly delivers into the core, it is necessary to pressurize the top of the reactor and the exchanger to maintain for the pump a pressure of the covering gas which is at least equal to atmospheric pressure and this causes problems. However, if the pump is placed in a hot branch, it is exposed to a much higher temperature and its cost is increased, particularly as a result of more severe mechanical design conditions and a more restricted choice of the structural materials. Moreover, in the second case, even though the top of the reactor can be at a pressure close to atmospheric pressure and like the pump, the exchanger is under a high pressure (about 10 bars) because in the case of direct pump delivery it is under a pressure representing the sum of the pressure drops of both exchanger and core. The high pressure in the exchanger primary must also have repercussions on the secondary circuit if it is to be ensured that, in the case of a break on the exchange surface of the exchanger the secondary sodium penetrates the primary sodium and not the other way round. Such an operating pressure at the exchanger has repercussions on the mechanical dimensions and therefore on the cost, both of the primary and secondary loops, including the exchanger. They increase the risks of sodium leaks and make them much more dangerous (atomized and not sheet sodium fires).

If a secondary loop is not available, it is necessary to insulate the corresponding primary loop or loops, which necessitates the use of large diameter sodium valves, which are particularly expensive and whose operation or untimely blocking leads to a risk of partial or even total stoppage of the flow within the core. Moreover, the putting out of operation of a primary loop also puts a pump out of operation, which is not the case in the integrated system.

It is difficult to bring about cooling on stopping the reactor because the hydraulic circuit must then either use the outer loops which may have become defective for various reasons during their stoppage, or must close within the actual interior of the reactor vessel, which is relatively complex due to the small size of this vessel.

In the case of loop reactors and in the variant when the secondary loops are eliminated consideration has also been given to a primary circuit in which the pumps are integrated into the steam generator. However, although such a design increases compactness and reduces the length of the pipes, it has numerous disadvantages such as the need of pressurizing the top of the reactor, the low absolute pressure value in the case of suction of the pumps, the existence of a high pressure piping system which is not doubly confined, etc.

The present invention therefore relates to the construction of a nuclear reactor cooled by a liquid metal and having a new arrangement of the primary circuit. The latter retains the main advantages of the integrated variant and eliminates most of the disadvantages of the loop circuit. In addition, it has certain special features constituting supplementary advantages compared with those of the integrated and loop systems considered individually. Thus, the present invention relates to the construction of a new type of nuclear reactor cooled by a liquid metal making it possible to significantly reduce investment costs compared with integrated and loop reactors.

Therefore, the present invention proposes a nuclear reactor cooled by a liquid metal comprising a main vessel sealed by a sealing slab, said vessel containing liquid metal overhung by a covering of inert gas, the reactor core being placed in a primary vessel integrated into the main vessel in such a way that the primary vessel at the outlet from the core constitutes a hot collector for the liquid metal and the space defined between the main vessel and the primary vessel constitutes a cold collector for the liquid metal, at least one heat exchanger supplied by the liquid metal contained in the hot collector under the action of at least primary pump located in the main vessel, wherein the exchanger is positioned outside the main vessel at a level above that of the sealing slab and communicates with the hot collector by at least one intake pipe and with the cold collector by at least one outlet pipe, it being possible to empty the exchanger and pipes into the main vessel by gravity, the upper part of each exchanger being filled with an inert gas covering linked with the inert gas covering of the main vessel by at least one gas pressure balancing pipe in which is arranged at least one valve closed under normal operating conditions, the inert gas covering of the main vessel being pressurized in such a way that the exchanger is filled with liquid metal by counterpressure, the opening of the said valve controlling the emptying of the exchanger and the corresponding intake and outlet pipes into the main vessel.

Throughout the remainder of the text, the term external circuits will be used to designate the assembly constituted by the exchanger and the pipes referred to hereinbefore.

The primary vessel preferably has an upper edge located above the liquid metal levels in the hot and cold collectors when the valve or valves are closed and the liquid metal level in the main vessel is above the upper edge when the exchanger or exchangers are simultaneously emptied by opening the valve or valves so as to permit a liquid metal circulation within the main vessel through the core and then between the hot and cold collectors, then communicating by the top of the upper edge of the primary vessel either by natural circulation or by means of at least one of the circulating pumps.

In per se known manner, the nuclear reactor according to the invention may comprise at least one cooling exchanger on shutdown. According to a secondary feature of the invention, this exchanger is preferably located in the cold collector at a level above that of the liquid metal therein when the outer circuits are full of liquid metal and at a lower level than the liquid metal level in the main vessel when the outer circuits contain no liquid metal.

According to another secondary feature of the invention, primary pump or pumps are positioned in the cold collector at a level above that of the liquid metal therein when the outer circuits are full of liquid metal and at a level below the liquid metal level in the main vessel when the outer circuits contain no liquid metal.

The primary pump or pumps can then have in each case a suction tube which is immersed in the liquid metal contained in the cold collector and a delivery tube which issues into a support carrying the reactor core. To prevent any gas entering the tubes in the case of breaks in the delivery tube or suction tube, the latter is preferably positioned within the delivery tube over the entire height between the corresponding pump and the liquid metal level in the cold collector when the outer circuits are full of liquid metal and when the pumps are operating.

The primary pump or pumps can also have in each case a suction tube issuing into the discharge pipe of the corresponding exchanger and a delivery tube issuing into a support carrying the reactor core, said suction tube having no high point. This feature makes it possible to prevent the accumulation of a covering gas bubble in a pump at the time of shutdown, when the latter is exposed under normal operating conditions. Thus, it enables a gas bubble which enters the pump to escape into the exchanger. It also ensures that the main sodium flow does not pass through the cold collector during normal operation of the reactor.

According to another secondary feature of the invention, the primary pump or pumps operated with suction from the top and at least one branch tube connects the delivery tube with the upper part of the pump in order to define in the latter a liquid metal buffer by removing a small liquid metal flow from the delivery tube.

This feature prevents the formation of a gas bubble in the pumps when they are exposed in normal operating conditions. Preferably, the branch tube issues into the upper part of the pump at a level above the minimum level of the free surface of the liquid metal buffer contained in the pump and issues into the delivery tube at a level below that of the liquid metal in the main vessel when the outer circuits are full and when the pumps are stopped.

According to another secondary feature of the invention and in order to reduce to the maximum the length of the outer tubes of the main vessel, the exchanger or exchangers comprise an outer ferrule in which is arranged a group of tubes in which circulates a secondary fluid. The corresponding intake pipe enters the exchanger at the lower end of the latter and issues into the outer ferrule in the vicinity of the upper end of the group of tubes.

According to a special embodiment of the invention, the heat exchanger or exchangers, as well as the intake and outlet pipes are equipped at least in part with a double jacket defining an intermediate inert gas-filled space, which communicates with the inert gas covering of the main vessel.

According to another embodiment, this intermediate space is linked with a space defined between the main vessel and a safety vessel, which in per se known manner duplicates the main vessel outside the latter.

The invention is described in greater detail hereinafter relative to non-limitative embodiments and with reference to the attached drawings:

FIG. 1 a diagrammatic sectional view of a first embodiment of the primary circuit of a nuclear reactor cooled by liquid metal in accordance with the present invention.

Figure 2:
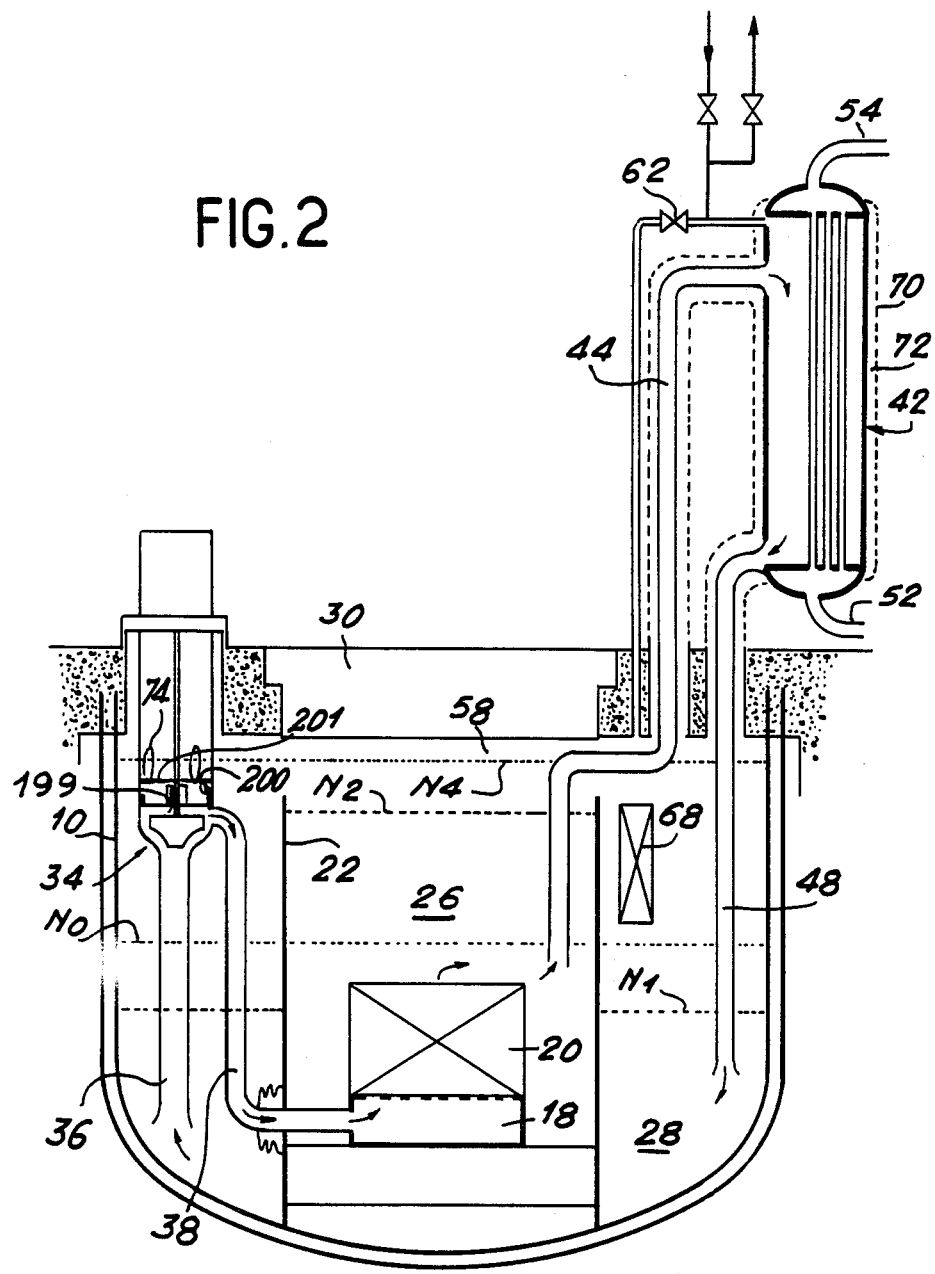

FIG. 2 a sectional view comparable to FIG. 1 illustrating a second embodiment of the reactor according to the invention, differing from the first embodiment of FIG. 1 by the arrangement of the primary circulating pumps, the location of the cooling exchangers on shutting down the reactor and the way in which the sodium is recovered in the case of breaks in the first jacket of that part of the primary circuit outside the main vessel.

Figure 3:
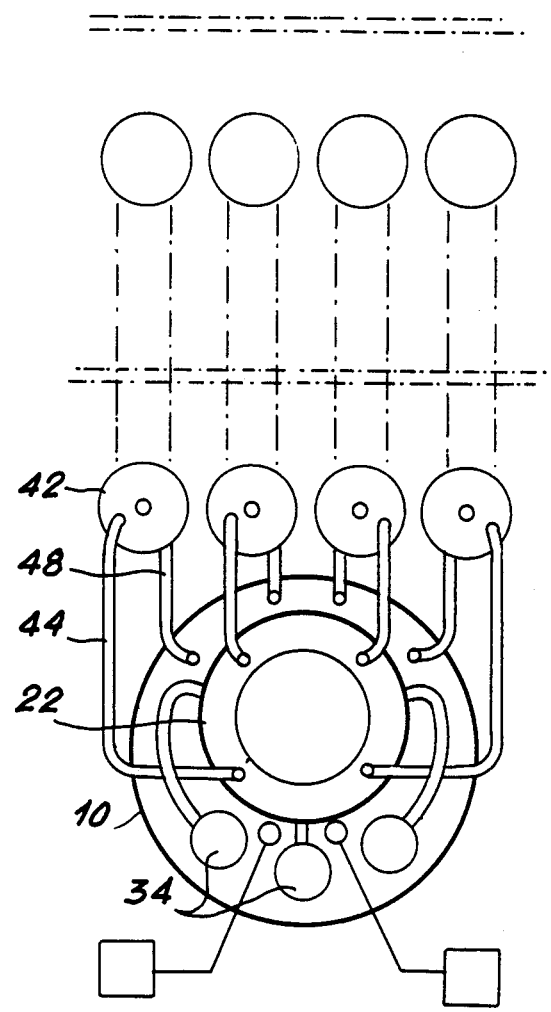

FIG. 3 a diagrammatic plan view illustrating a possibility of a particularly advantageous positioning of the primary circulating pumps and the exchangers of the reactor according to the invention.

Figure 4:
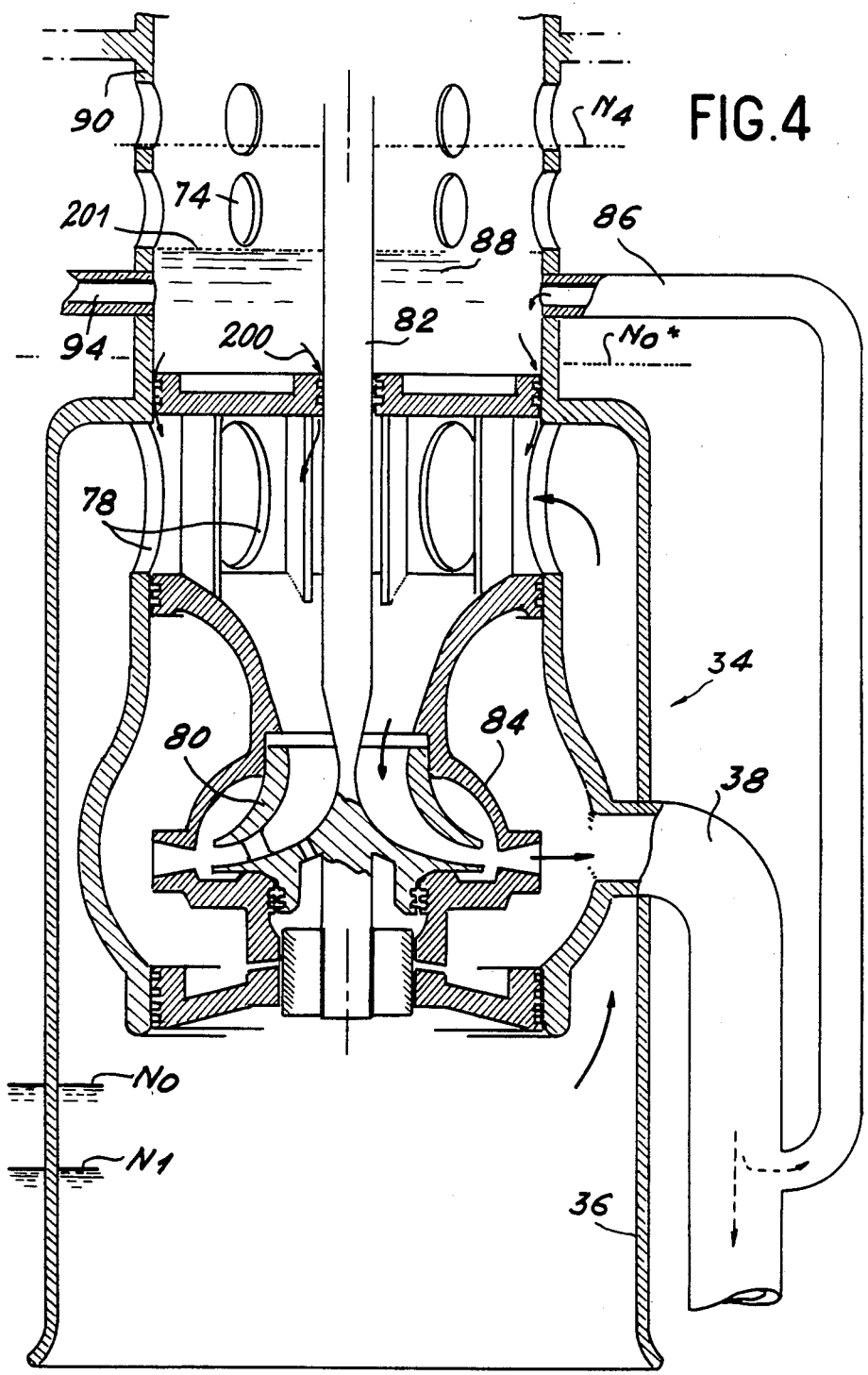

FIG. 4 a larger scale longitudinal sectional view of a primary circulating pump particularly suitable for use in the reactor according to the invention in the exposed position during normal operation of the reactor.

Figure 5:
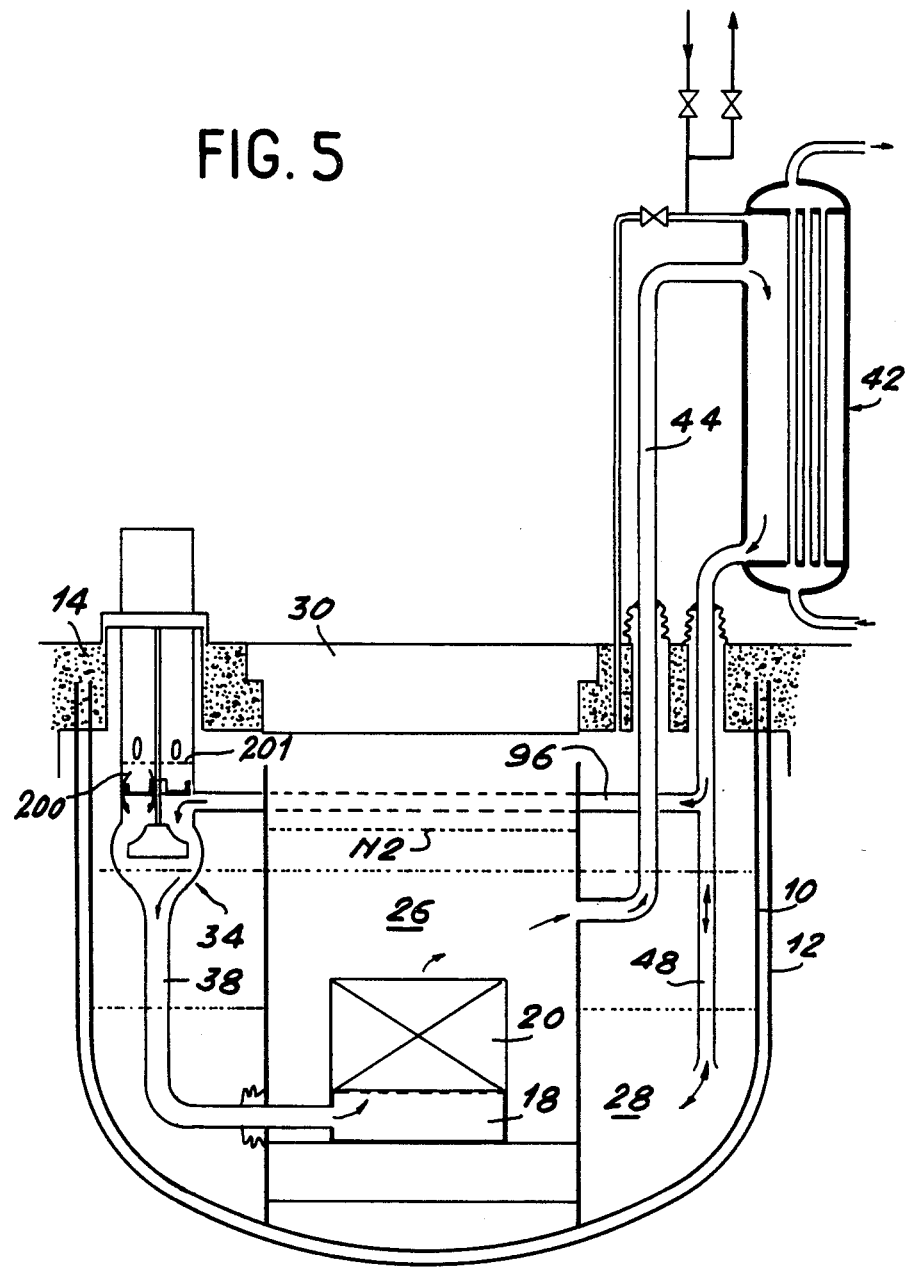

FIG. 5 a diagrammatic sectional view comparable to FIGS. 1 and 2 illustrating another constructional variant of the invention, particularly having a supplementary branch tube ensuring a direct connection between the exchanger and the primary circulating pump in the case when the latter is exposed under normal operating conditions.

Figure 6:
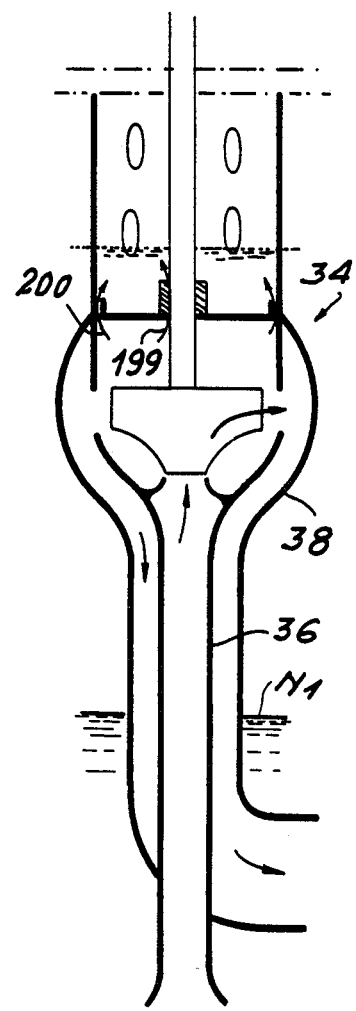

FIG. 6 a diagrammatic sectional view of a pump with suction from the bottom which can be used in the reactor according to the invention, said pump being supplied by a suction tube surrounded by the delivery tube in the entire area positioned above the sodium level during normal operation of the reactor.

Figure 7:
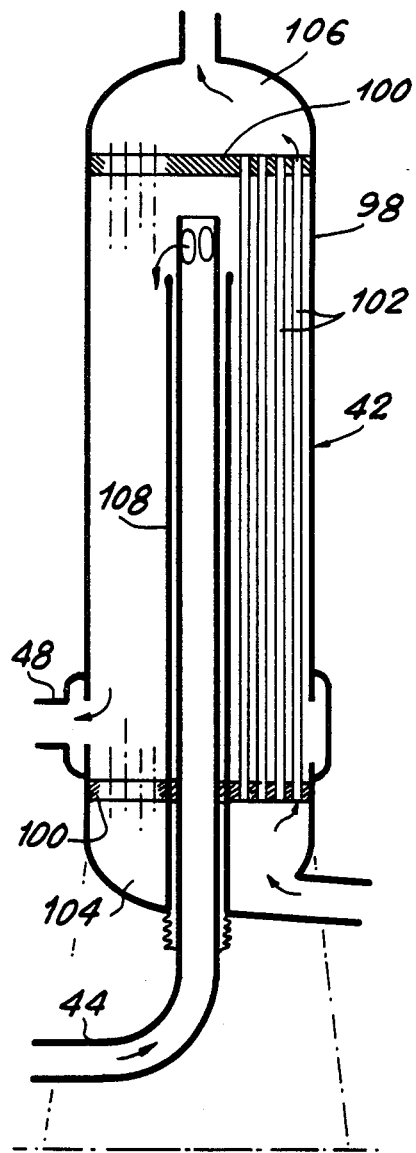

FIG. 7 a diagrammatic sectional view of a heat exchanger, particularly suitable for use in the nuclear reactor according to the invention, this exchanger being supplied with primary sodium by means of a tube entering the exchanger from the bottom and integrated into the latter.

As is diagrammatically illustrated in FIG. 1, the nuclear reactor according to the invention comprises in the same way as liquid metal-cooled integrated reactors, a main vessel 10 externally completely duplicated by a safety vessel 12, vessels 10 and 12 being sealed by a sealing slab 14 which also supports them in the variant shown. Vessels 10 and 12 preferably have a cylindrical symmetry and vessel 10 also supports in per se known manner flooring 16 resting on the bottom of vessel 10 and which, by means of a support 18 supports the reactor core 20. The latter contains the fissile assemblies, the fertile assemblies and the neutron assemblies, in the same way as in per se known manner liquid metal-cooled reactors.

The reactor core 20 is housed within an inner vessel or primary vessel 22, which is cylindrical in the represented embodiment. The latter subdivides the sodium 24 contained in main vessel 10 into a hot collector 26 positioned immediately above the reactor core and a cold collector 28 formed by the annular space defined between inner vessel 22 and main vessel 10. In per se known manner, above the reactor core the sealing slab 14 has an opening sealed by one or more rotary plugs 30 supporting the instrumentation cover of the core, the fuel handling device and the not shown control rods. The inner vessel 22, which is supported by flooring 16 in the represented variant, defines at its upper end a free edge 32 located at a certain distance below slab 14.

As in the case of integrated reactors, slab 14 supports a plurality of pumps 34, whereof only one is shown in FIG. 1. Pumps 34 are arranged in a space defined between inner vessel 22 and main vessel 10 and are immersed in liquid sodium 28 in the variants shown in FIG. 1. They can be constituted by any per se known pump type and particularly by mechanical pumps with suction from the bottom or the top. Each pump 34 removes the cold liquid sodium contained in collector 28 by means of a suction tube 36, whose lower part is immersed in sodium 24. The latter is supplied to support 18, which also supplies primary sodium to core 20 by a delivery tube 38 traversing inner vessel 22 via a sealing device 40.

According to the invention, the reactor of FIG. 1 differs from integrated reactors by the fact that the heat exchangers 42 are located outside the main vessel 10 and more specifically completely above slab 14. These exchangers 42, which can be of any random known type, receive the primary sodium from the hot collector 26 by an intake tube 44 which is immersed in hot collector 26, traverses slab 14 via a sealing device 46 and enters the outer ferrule of exchanger 42 in the upper part thereof. Within exchanger 42 the primary sodium gives off the calories which it carries either to the secondary sodium in the case where the exchangers 42 constitute intermediate exchangers, or to the water of the water/steam circuit in the case where the exchangers 42 constitute steam generators.

The secondary sodium or water is circulated in known manner from bottom to top in a group of tubes between an intake port 52 and an outlet port 54. The cooled primary sodium is then passed to the cold collector 28 by a discharge tube 48 issuing into the lower part of the outer ferrule of exchanger 42, traversing slab 14 via a sealing device 50 and then plunging into collector 28.

A gas pressure balancing pipe 56 links the inert gas covering 58 or top of the reactor overhanging the sodium 24 within the main vessel 10 with an inert gas pocket or covering 60 defined in the upper part of each of the exchangers 42 above the sodium. In a not shown variant, the inert gas pocket 60 of each of the exchangers 42 can be constituted by a reservoir independent of the exchanger and connected to the latter at a high point by a short tube acting as a drain or vent. Tube 56 is normally sealed by one or more valves 62. A tube 4 issues into tube 56 between valve 62 and the covering 60 of each of the exchangers 42 or directly into covering 60. It makes it possible by means of appropriate valve 66 to permit the entry or reject the covering gas, which is generally formed by argon.

To ensure that the free level $N_3$ of sodium in each exchanger 42 is reached even in the case of a stoppage of pumps 34, valves 62 are normally closed and a gas pressure difference is established between the reactor cover 58 and the gas pocket 60 of the exchangers.

This pressure difference exactly balances the difference in level of the sodium between sodium level $N_3$ in the exchangers and sodium reference level $N_0$ in the main vessel on stopping pumps 34. Thus, if the pressure of gas pocket 60 of the exchangers is close to and preferably slightly higher than atmospheric pressure, as is generally the case, the pressure of the reactor gas covering 58 must be substantially higher at atmospheric pressure (.e.g. 1.5 to 2 bars relative, as a function of the variation between the free levels $N_3$ and $N_0$). Moreover, it can be seen in FIG. 1 that the free level $N_0$ is significantly below that of the upper edge 32 of inner vessel 22 and consequently that of sealing slab 14. This reduction of level $N_0$ serves on the one hand to take account of the rise in the sodium level in hot collector 26 when pumps 34 are operating and on the other hand to retain within main vessel 10 the free volume adequate for receiving all the sodium from the primary circuit during reactor shutdown, as will be shown hereinafter.

Thus, during the starting up of pumps 34 the free levels of sodium in hot collector 26 and cold collector 28 move away from their initial positon $N_0$ due to the pressure drop of the complete outer circuit (exchanger 42, inlet tube 44 and outlet tube 48). The free level $N_2$ of sodium in hot collector 26 thus becomes greater than the reference level $N_0$, whilst the free level $N_1$ of sodium in the cold collector drops below said reference level. However, as has been stated hereinbefore, the sodium level $N_2$ in the hot collector remains below that of the edge 32 of primary vessel 22 when all the pumps 34 are operating in order to prevent the establishment of a discharging sheet partly short-circuiting exchangers 42. Conversely, sodium level $N_1$ in cold collector 28 must not be too low in order to permit an immersion of the opening of each outlet tube 38 sufficient to prevent excessive agitation of the free surface of the sodium in said collector. For the same reason, sodium level $N_0$ in vessel 10 on stopping pumps 34 which must obviously be adequate to completely immerse core 20, must also permit an adequate immersion of the openings of each of the intake tubes 44 so as to ensure a correct circulation of sodium as from the starting up of pumps 34 or by a thermal siphon effect.

It should be noted that the starting up of pumps 34 tends to vary the sodium level $N_3$ in the exchangers. In order to maintain this level, it is necessary to remove or inject gas into the gas pocket 60 of each exchanger 42. However, on referring to the accepted values for the pressure drops of tubes, it can be seen that the variations of level $N_3$ are very small between slow stoppage and full load conditions. The gas volumes to be injected into or removed from gas pockets 60 are consequently low, unlike in the case of loop reactors. Thus, the freedom of movement of sodium levels $N_1$ and $N_2$ in the cold and hot collectors of the reactor according to the invention ensures an automatic regulation of level $N_3$ of the free surfaces of sodium in exchangers 42. Thus, on passing from the operating state to the stoppage state of pumps 34, the natural drop in the sodium level $N_2$ in hot collector 26 tends to reduce the variation of sodium level $N_3$ in the exchangers. The first reactor according to the invention is consequently easy to regulate, unlike a loop reactor.

It should also be noted that the difference in level between exchangers 42 and core 20 of the reactor according to the invention makes it possible to ensure under excellent conditions a coding of core 20 by natural convection when the pumps are stopped. Thus, the difference in level between the hot source constituted by the core and the cold source constituted by each exchanger is much greater than in known integrated or loop reactors.

According to another feature of the invention all the external circuits constituting those parts of the inlet and outlet tubes 44, 48 respectively outside the main vessel 10 and exchangers 42 can be emptied by gravity into the main reactor vessel 10. To this end, tubes 44 and 48 have no reverse slope or retention point liable to trap sodium. Due to this feature, it is possible to completely empty the external circuits into the main reactor vessel by simultaneously opening all the valves 62, which has the effect of reestablishing the pressure balance between the inert gas covering 58 and the inert gas pocket 60. Such an emptying can also be carried out when the reactor is shut down for a long time corresponding to a maintenance period, to the handling of the fuel or to an incident such as the total failure of the water/steam circuit leading to the loss of the normal cooling means.

The effect of emptying the outer circuits is to raise the sodium level in the main vessel 10 to level $N_4$ positioned above the level of free edge 32 of inner vessel 22, so that a sodium circulation can be established in the main vessel, as is the case in the normal operation of an integrated reactor. The residual power is then removed from the reactor in per se known manner by means of sodium/sodium exchangers for cooling the reactor when shut down. One of these exchangers is shown diagrammatically at 68 in FIG. 1. The construction of these exchangers is well known to the Expert, particularly in connection with integrated reactors and will not be described in detail here. It is merely pointed out that in the embodiment of FIG. 1, the exchangers 68 are located in cold collector 28 below the sodium level $N_1$ corresponding to the normal operation of the reactor.

The circulation of sodium within the main vessel can then be obtained by means of pumps 34, which are used at a moderate speed in order to limit the discharging sheet above edge 32 of the primary vessel and due to the fact that the pressure drop of the hydraulic circuit is reduced compared with that in normal operation. The liquid sodium flow within the main vessel 10 necessary for cooling the reactor when shut down can also take place by a thermal siphon effect, without any intervention of pumps 34. Thus, the reduction of the pressure drop of the circuit during the cooling of the reactor when shut down facilitates the cooling of the core by a thermal siphon effect. This is an advantage not encountered with either integrated reactors or loop reactors.

The handling of fuel assemblies under sodium within the main vessel 10, which takes place after emptying the outer circuits, requires in per se known manner that the distance between the sodium level $N_4$ in the main vessel and the upper face of the core 20 be greater than the height of an assembly. This fuel handling operation can take place after depressurizing the inert gas covering 58. This handling operation, which generally requires action on the confinement sealing, then takes place under conditions which are just as favourable as in integrated reactors (large sodium-filled vessel surmounted by a low pressure gas covering preventing any risk of sodium being ejected into the atmosphere). The surplus gas can then be provisionally stored in primary sodium storage reservoirs, which at the time contain no sodium and which are shown in FIG. 1.

To ensure that it is still possible to carry out cooling when shutting down the reactor, even in the case when the main vessel 10 is perforated and the space defined between vessel 10 and 12 is filled with sodium, sodium level $N_4$ should as far as possible not drop below the upper edge 32 of the primary vessel. However, this condition may not be respected if an appropriate opening is provided for this purpose in primary vessel 10, which links hot collector 26 and cold collector 28 without discharging over the primary vessel (Such a not shown opening is known in the art as a "bond").

In known manner in connection with loop reactors the outer circuit, i.e. the outer part of the inlet tube 44 and outlet tube 48 and the outer ferrule of the exchangers 42 are provided with a double jacket 70 for preventing any sodium leak in the outer circuit under normal operating conditions.

In the constructional variant of FIG. 1, the annular space 72 defined by this double jacket is advantageously linked with the gap between vessels 10 and 12. This link is easily obtained without a low point or reverse slope because this situation already exists for the external sodium circuits. Therefore, any leak from the external circuit is drained into the gap between the vessels and does not have to be deducted in the evaluation of a drop in the sodium level $N_4$ as a result of a break in the main vessel 10. This arrangement is particularly advantageous compared with loop reactors in which draining is not possible, the corresponding condition being more stringent and therefore more costly to obtain.

On considering the presently accepted characteristics for exchangers (primary sodium volume contained), tubes (diameter and length), pressure drops for the components and finally the core dimensions, it can be seen that the geometrical constraints to which reference was made in connection with the known integrated reactors are easily verified in the reactor according to the invention. There is even a greater scope for the choice of the exchanger pressure drop which, instead of being limited to about 2 m of sodium, as is the case with integrated reactors, can be increased. Under these conditions, the exchanger is much easier to dimension and optimize, so that its cost can be reduced. Moreover, the increase in the pressure drop of the exchangers has no effect on the reactor cooling conditions on shutdown, because the exchangers are then placed out of circuit.

The raised position of exchangers 42 makes it possible to easily isolate one or more of them by merely opening the corresponding valve or valves 62. This may be made necessary by the non-availability of a secondary loop. This operation is much easier to carry out than the known reactors where it is necessary to use complex, costly devices, such as sealing means for the intake ports of the exchangers in integrated reactors which have to be remotely manipulated or the large sodium valves which have to be used in loop reactors. In the reactor according to the invention, the emptying of one or more exchangers 42 obviously leads to a rise in sodium levels $N_1$ and $N_2$ in the cold and hot collectors. However, the geometrical constraints referred to hereinbefore do not then prevent the extraction of a significant power by means of the exchangers 42 remaining in operation. For an identical number of secondary loops, the reactor according to the invention supplies under these conditions a power identical to that which can be supplied by integrated or loop reactors.

In the reactor according to the invention pressurization of the inert gas covering 58 makes it possible to increase the rotation speed of the pumps, reduce the diameter of their impellers and their overall plan dimensions, particularly to the right of the cross-member of slab 14. As this improvement to the pump performance levels is not due to an increase in the length of their control shafts, there is a reduction in the unit cost of the pumps.

Moreover, as the pumps are lighter and as the exchangers are no longer supported by the slab, the latter is loaded much less than in integrated reactors. Moreover, its structure has fewer large cross-section holes required for the passage of components. The structure ensuring the mechanical behaviour and optionally the thickness of slab 14 are reduced compared with the integrated system, so that the slab costs are reduced.

FIG. 2 illustrates diagrammatically another embodiment of the invention having the essential characteristics of the embodiment of FIG. 1. It is apparent therefrom that the exchangers 68 for cooling the reactor on shutdown can advantageously be positioned at a level which is as high as possible, but lower than level $N_4$ in the annular space defined between inner vessel 22 and main vessel 10. This arrangement, which leads to a difference in level between reactor core 20 (hot source) and exchangers 68 (cold source) aids the formation of a thermal siphon within the main reactor vessel 10, when the external circuits have been emptied into the latter. This feature, together with the reduction in the pressure drop of the circuit during the cooling of the reactor at shutdown facilitates the cooling of the core by the thermal siphon effect, after stopping pumps 34. It also makes it possible to expose exchangers 68 in normal operation, i.e. to place them above the sodium level $N_1$ in cold collector 28. Exchangers 68 are consequently thermally insulated by inert gas covering 58 and are protected from the normal thermal transients.

The embodiment of FIG. 2 also differs from that of FIG. 1 by the fact that space 72 defined by the double jacket 70 of the external circuit is directly connected with the inert gas covering 58 in such a way that sealing devices 46 and 50 (FIG. 1) are eliminated. In this variant, any break in the external primary sodium circuit leads to gas entering the sodium of the circuit and not to liquid metal being leaked to the outside of the circuit. Thus, a gas pressure higher than that of the sodium circulating in inlet and outlet tubes 44 and 48 respectively permanently exists in space 72. This entry of gas has the advantageous result of automatically emptying the sodium from the defective external circuit into the main vessel 10.

Finally, the embodiment of FIG. 2 differs from that of FIG. 1 by the fact that the pumps 34 are exposed in normal operation, i.e. they are positioned above the liquid sodium level $N_1$ in the cold collector and even above the corresponding reference level $N_0$ on stopping the pumps. The suction tube 36 of each of the pumps is then immersed in the sodium contained in cold collector 28 in the manner illustrated in FIG. 2. Certain secondary features of the invention which are particularly suited to such an arrangement of pumps 34 will be described hereinafter with reference to FIGS. 4 to 6.

In accordance with the present invention, the diameter of the main vessel 10 and that of the sealing slab 14 are essentially determined by the diameter of the primary vessel 22 and that of pumps 34. Thus, compared with integrated reactors the overall dimensions of the exchangers are replaced by the much smaller overall dimensions of inlet and outlet tubes 44, 48. Therefore, the diameter of the main vessel 10 is significantly reduced, as is the thickness of the space between main vessel 10 and inner vessel 22. In order to fully utilize these advantages, FIG. 3 diagrammatically shows a plan view of a reactor according to the invention with a diametrical symmetry. In this reactor, it is possible to see that the cylindrical primary vessel 22 is displaced with respect to the axis of the cylindrical main vessel 10 and that the three pumps 34 (cf FIG. 3) are brought together opposite to the primary vessel 22. This arrangement, which clearly reduces the diameter of main vessel 10 may also make it possible to reduce the number of pumps 34 by increasing their size, but causing no increase in the diameter of the main vessel. Therefore, the reactor costs are significantly reduced. FIG. 3 also shows four exchangers 42 and inlet and outlet tubes 44 and 48 by which they communicate with the hot and cold collectors respectively. As can be seen from FIG. 3, exchangers 42 can also be aligned on the same side of the reactor, which makes it possible to reduce the length of the intermediate circuits and/or the water-steam tubes.

The construction of the reactor according to the invention also makes it possible to reduce the height of the main vessel, as well as that of numerous components contained therein, particularly the control rods, the core instrumentation cover and the fuel handling devices (not shown). Thus, whereas in the case of an integrated reactor these heights are penalized by an extra height due to the pressure drop of the exchangers, this extra height does not exist in the case of the reactor according to the invention because the levels $N_0$, $N_1$ and $N_2$ occupied by the sodium in normal operation are well below the maximum sodium level $N_4$ reached during handling operations.

In order to fully benefit from the possibility of reducing the length of the shaft of pumps 34, it is possible, and as has been indicated in connection with FIG. 2, to make them operate without sodium on their outer face. However, they would be immersed during handling operations because level $N_4$ is then at a maximum and very close to slab 14.

In a first variant (not shown) it is then possible to arrange pumps 34 in such a way that they are immersed when stopped. The exchangers 42 being filled (sodium level $N_0$ in the vessel) and the pumps 34 exposed in operation, i.e. positioned above sodium level $N_1$ in cold collector 28. Pumps 34 can then be known mechanical pumps with a free surface and bottom suction. The operational leaks of these pumps (leaks at hydrostatic bearing 199, leaks through the clearances 200 permitting easy disassembly) are always exposed at their inner opening to the delivery pressure, provided that vents 74 are used, which then also act as overflows (FIGS. 1 and 2) above the outer discharge point of said leaks. These vents 74 lead to the formation of a sodium buffer (201 in FIG. 2) immersing the outer discharge point of the leaks. Thus, in normal operation, there is no risk of external covering gas from being sucked towards the interior of the pump, which would obviously be prejudicial to its operation and instead this takes place towards the reactor core (thermal and neutron effects). If one of the pumps 34 stops operating, those which continue to operate create an adequate pressure for preventing a reversal of the flow direction of the operational leaks of the stopped pump. The volume of the sodium buffer in the pumps must obviously be calculated so as to take account of the transient conditions of the progressive stoppage of the pumps on inertia and of the displacement of the sodium level in the cold collector from $N_1$ to $N_0$ corresponding thereto.

In the embodiment of FIG. 2, the pumps can be exposed, even when stopped. They are then partly or completely located above the sodium level $N_0$. In this configuration and when the pump is stopped, the functional leak immersion buffer may progressively be emptied, so that the gas can enter the pump. Bearing in mind the position of the high point of the pump on tube 38 connecting cold collector 28 to core 20, this may lead to the formation of a gas pocket to the right of the pump and which may completely block off the flow including that produced by natural convection. However, this risk can be obviated by using a known process consisting of supplying the operational leak immersion buffer with a top-up flow supplied by a pump independent of the main pumps and having a moderate flow rate. This independent pump may be formed by the electromagnetic pump supplying the sodium purification system (cold trap).

The pumps 34 may also be constituted by mechanical pumps with a free surface and top suction of known types. As in the case of pumps with bottom suction, said pumps may or may not be immersed on stoppage. If the outer surface of the pump is immersed, everything takes place much as for an integrated reactor (this is shown in FIG. 1 with a bottom suction-type pump). Conversely, if the outside of the pump is exposed, external gas may enter there during the operation of the pump.

To obviate this disadvantage, FIG. 4 shows a special arrangement of a mechanical pump with top suction which is to be exposed when the pump is operating. It is possible to see the suction tube 36, which simultaneously forms the outer pump case the cold sodium intake ports 78 within the actual pump, the rotor 80 controlled by its shaft 82, the stator 84 and the lateral sodium delivery tube 38. According to the arrangements of FIG. 4 a branch pipe 86 makes it possible to supply the sodium buffer 88 formed above the pump within the ferrule 90 surrounding the control shaft with a small sodium flow removed from the pump outlet. More specifically, this small sodium flow is removed from the main flow either in the delivery tube 38 or directly at the pump outlet.

Pipe 86 preferably issues at a level above the minimum level $N_0^*$ which must be occupied by the free surface of buffer 88 so that it can ensure an adequate immersion of the operational leaks 200 under normal operating conditions. This level $N_0^*$ is advantageously detected by a not shown level measuring probe. Above the opening of pipe 86 and, as in the case of bottom suction pumps, vents 74 are provided in ferrule 90. These vents balance the gas pressures above buffer 88 and in the reactor gas covering 58. Certain of these vents 74 also serve as overflows for the sodium in ferrule 90.

The positioning of the opening of pipe 86 above level $N_0^*$ makes it possible to prevent a too rapid suction of buffer 88 in the case of the simultaneous stoppage of all the pumps. If this were not the case, the sodium contained in buffer 88 would be simultaneously sucked in by the operational leaks 200 and the tube 86, whereas the latter only sucks in the covering gas in the present configuration. Moreover, to ensure that the thus sucked-in gas does not enter the main tube 38, it is preferable to position the tap upstream of tube 86 on said tube 38 below level $N_0$ and even below level $N_1$, in order to obtain absolute guarantees under transient operating conditions. Thus, the suction of the covering gas by tube 86 is limited to the establishing of a hydrostatic equilibrium corresponding to the descent of sodium into tube 86 to level $N_0$.

In the case where pump 34 is located above level $N_0$, there is a risk of the sodium buffer 88 being emptied a certain time after the pumps have stopped. The covering gas may then penetrate the pump leading to the disadvantages referred to hereinbefore. To obviate this disadvantage, it is possible to use the known process of the topping up of the sodium flow by an auxiliary pump introduced into ferrule 90 by a tube 94 (FIG. 4), as has been stated hereinbefore for bottom suction pumps. It is also possible to use a process specific to top suction pumps and used in the reactor diagrammatically shown in FIG. 5. This process consists of directly connecting exchanger 42 to pump 34 without passing through cold collector 28 by means of a tube 96. More specifically, tube 96 links the outlet tube 48 of the exchanger directly to the intake ports 78 of pump 34, whilst preventing any high point along tube 96. Tube 96 then replaces suction tube 36, which is eliminated in this configuration. Due to this arrangement, the gas bubbles which enter the pump 34 do not accumulate there and instead rise by gravity along tube 96 and tube 48 and are finally degasified at the high point of the exchanger 42. The level regulating means at the exchanger high point then compensate the tendency to lower level $N_3$ of said high point.

Finally, no matter what the type of pump used and no matter what the pump level in the main vessel, if the aforementioned means for preventing a gas pocket are defective or not used, it is still possible to bring about the emptying of the external circuits by opening valve 62. This brings about the completely reliable situation of cooling at reactor shutdown. It should also be noted that if a gas pocket has been produced in the pump before emptying the external circuits, it would have rapidly had the possibility of resorption after emptying (sodium level $N_4$ reached in the vessel) by bubbling through the openings of operational leaks 200 (FIGS. 1, 2, 4, 5 or 6).

When the pumps 34 are exposed, an accidental risk of penetration of the covering gas in the case of pump suction can also result from a break in the suction tube 36 in the area where it is externally immersed by the covering gas 58. FIG. 6 shows a special arrangement making it possible to obviate this disadvantage using as an example, because it is particularly advantageous, the case of a bottom suction pump. This arrangement consists of positioning the suction tube 36 within the delivery tube 38 of the pump over the entire height of the pump 34 and sodium level $N_1$ in the cold collector under normal operating conditions. Due to this arrangement, if there is a break in the inner suction tube 36, there is no suction of covering gas and instead a diverting off of part of the pump flow by the break. If a break occurs on the outer delivery tube 38 there is no entry of gas under normal operating conditions, because the breech then ejects pressurized sodium.

In addition to the advantages of the invention referred to hereinbefore, it is also pointed out that the increased pressure drop of the external circuits leading to the pressure difference between sodium levels $N_1$ and $N_2$ can be utilized for ensuring that the inner vessel 22 defining the hot collector 26 is externally immersed by the covering gas. This obviates the costly thermal baffles which must be necessarily used in integrated reactors in order to limit the thermal gradients between the hot and cold collectors. Simultaneously, the level difference between levels $N_1$ and $N_2$ permitted by the present invention enables the covering gas 58 to immerse a considerable height of main vessel 10 in normal operation. Thus, the main vessel is naturally thermally insulated and consequently kept at a low temperature, without requiring the complex cooling system used in integrated reactors.

Moreover, according to the invention, the high pressure portion of the primary circuit is short and doubly confined in the main vessel as in integrated reactors, whilst the external circuit portion is at very low pressure because it is at an altitude (static pressure effect) and upstream of the pumps (pressure drop distribution effect). These features are particularly advantageous compared with those of loop reactors in which a considerable length of the external circuits, (generally comprising the exchanger) is directly exposed to the delivery pressure of the pumps (approximately 10 bars), so that the risks of breaks and consequently leaks are increased and in which for the purpose of preventing penetration of radioactive primary sodium into the secondary sodium in the case of breaks in the exchanger it is necessary to pressurize the secondary circuit to a pressure (e.g. 10 bars) higher than that in the primary circuit exchanger.

FIG. 7 shows a constructional variant of an exchanger for use in a reactor according to the invention. This exchanger further limits the length of the tubing outside the main vessel 10. FIG. 7 shows the outer cylindrical ferrule 98 of the exchanger, the upper and lower tube plates 100 between which are fixed the tubes 102 of the bundle of tubes in which circulates the secondary sodium (in the case of a sodium/sodium exchanger) and the inlet and outlet collectors 104, 106 respectively for the secondary sodium. In this variant, tube 44 enters exchanger 42 from the bottom of the latter and within ferrule 98 defines a shaft which opens out in the vicinity of the upper tube plate 100. A thermal baffle 108 is preferably placed around tube 44 within exchanger 42. The cooled primary sodium is discharged in conventional manner by tube 48 located in the immediate vicinity of the lower tube plate 100. The positioning of part of the inlet tube 44 within the exchanger makes it unnecessary to provide tube 44 with a double jacket over a considerable portion of its length.

It is pointed out that the reactor according to the invention becomes even more advantageous as the diameter of the main vessel 10 approaches that of the primary vessel 22. This feature can be used by slightly increasing the diameter of primary vessel 22 in order to free space in order to house there a temporary store of irradiated fuel discharged from the core. This store makes it possible to decrease the residual power of the fuel assemblies to a sufficient extent to enable the same to be removed from the reactor directly in gas and not under sodium. It is also possible to envisage eliminating the costly intermediate storage of sodium which generally takes place in a container independent of the main vessel. The loading/unloading machine conventionally associated with the transfer of fuel between the main vessel and the container will also benefit from this simplification.

It should also be noted that the present invention makes it possible to envisage the elimination of the intermediate sodium circuits, which is impossible in the case of integrated reactors in the present state of the art.

The invention is obviously not limited to the embodiments described in exemplified manner hereinbefore. Thus, for example, in FIG. 5 the inlet tube 44 carrying the liquid metal from hot collector 26 to exchanger 42 can be directly tapped on the side wall of primary vessel 22.

All the variants described and grouped for simplification purposes in FIGS. 2, 3, 5, 6 and 7 can be realised singly or in random combinations without passing beyond the scope of the invention.

I claim:

1. A nuclear reactor cooled by a liquid metal comprising:
    a main vessel sealed by a sealing slab and containing liquid metal having a free level covered by inert gas,
    a primary vessel housing a reactor core, positioned within the main vessel and defining in the latter a hot collector positioned above the reactor core and a cold collector formed by a space defined between the main vessel and the primary vessel,
    means for permitting the reactor to operate as an integrated-type reactor in the shut-down mode wherein the complete primary circuit is contained in the main vessel and as a loop-type reactor at other times wherein an intermediate heat exchanger and a primary pump are positioned outside the main vessel,
    at least one intermedite heat exchanger positioned outside the main vessel and communicating with the hot collector by at least one intake pipe and communicating with the cold collector by at least one outlet pipe, said intermediate heat exchanger being positioned at a level above a maximum value of the free level of liquid metal in the main vessel, the liquid metal normally contained in said intermediate heat exchanger having a free level covered by inert gas and, at least one primary pump for circulating said liquid metal between the cold collector and the reactor core for circulating liquid metal to the intermediate heat exchanger through said intake and outlet pipes, said primary pump being immersed in the liquid metal of the cold collector, pressurizing means for pressurizing the inert gas of the main vessel to a high value relative to the inert gas of the intermediate heat exchanger, actuation of said means controlling filling the intermediate heat exchanger and the intake and outlet pipes with liquid metal by counterpressure and giving a minimum value to the pressure at the free level of liquid metal in the main vessel, said pressurizing means being actuated under normal operating conditions of the reactor, said gas pressurizing means establishing a pressure difference between said inert gas convering said main vessel and said inert gas covering said heat exchanger free level which is substantially equal to the head of the liquid metal located between liquid metal level in the heat exchanger and a reference liquid metal level in the vessel, gas pressurizing balancing means which includes at least one balancing pipe connecting the coverings of inert gas of the intermediate heat exchanger and of the main vessel for balancing pressure of the coverings of the inert gas of the main vessel and of the intermediate heat exchanger so that liquid metal in the intermediate heat exchanger is at the same pressure as liquid metal in the main vessel prior to actuation of said primary pump, operating means which includes one valve which is closed under normal operating conditions and which is opened under shut-down conditions for placing said gas pressurizing means in a closed configuration during operating conditions in which said inert gas coverings are separated for permitting circulation of liquid metal through the intermediate heat exchanger by said primary pump, and in an open configuration during shut-down conditions in which said inert gas coverings are in fluid communication for emptying the intermediate heat exchanger and the intake and outlet pipes by gravity into the main vessel and establishing a shut-down value to the free level of liquid metal in the main vessel, said shut-down level being above said reference level, and establishing fluid communication between the hot collector and the cold collector during shut-down conditions, said operating means being opened under shut-down operating conditions of the reactor, at least one passage means in said primary vessel said passage means including an upper edge of said primary vessel located below said slab to define said passage means between said upper edge and said slab to be at a level above a maximum value of the free level of liquid metal in the main vessel during operating conditions and below a minimum value of the free level of liquid metal in the main vessel during shut-down conditions, for establishing in shut-down conditions and only during shut-down conditions, fluid communication between the hot collector and the cold collector which permits liquid metal to circulate through said passage means between sain hot collector and said cold collector within said main vessel, said minimum value being below said reference level, and a shut-down heat exchanger means operable during reactor shut-down conditions and located in said cold collector below said minimum free level of liquid metal for removing power and for cooling the liquid metal contained within said main vessel, under said shut down operating conditions of said reactor for establishing a thermal siphon effect.

2. A nuclear reactor according to claim 1, wherein the primary pump is located in the cold collector at a level between said minimum value and said maximum value of the free level of liquid metal in the cold collector.

3. A nuclear reactor according to claim 1, wherein the primary pump has a suction tube immersed in the liquid metal contained in the cold collector and a delivery tube issuing into a support carrying the reactor core.

4. A nuclear reactor according to claim 3, wherein the suction tube is positioned within the delivery tube over the entire length between the pump and said minimum value of the free level of liquid metal in the cold collector when the outer circuits are filled with liquid metal and the pumps are operating.

5. A nuclear reactor according to claim 2, wherein the primary pump has a suction tube issuing into said outlet pipe and a delivery tube issuing into a support carrying the reactor core, said suction tube having no high point.

6. A nuclear reactor according to claim 2, wherein the primary pump has top suction and wherein at least one branch tube links a delivery tube of said pump with an upper part of the pump in order to define in the latter a liquid metal buffer by removing a small liquid metal flow from the delivery tube.

7. A nuclear reactor according to claim 6, wherein the branch tube issues into the upper part of the pump at a level above the minimum level of the free surface of the liquid metal buffer contained in the pump.

8. A nuclear reactor according to claim 6, wherein the branch tube issues into the delivery tube at a level below the level of the liquid metal in the main vessel under normal operating conditions and when the pump is stopped.

9. A nuclear reactor according to claim 1, wherein the exchanger comprises an outer ferrule in which is arranged a group of tubes in which circulates a secondary fluid, the intake pipe entering the exchanger at the lower end of the latter and issuing into the outer ferrule in the vicinity of the upper end of the group of tubes.

10. A nuclear reactor according to claim 1, wherein the heat exchanger, the intake pipe and the outlet pipe are at least party equipped with a double jacket defining an inert gas-filled intermediate space, which is connected to the inert gas covering of the main vessel.

11. A nuclear reactor according to claim 1, wherein the heat exchanger, the intake pipe and the outlet pipe are at least partly equipped with a double jacket defining an intermediate inert gas-filled space connected with a space defined between the main vessel and a safety vessel duplicating the main vessel outside the latter.

* * * * *